(12) United States Patent
Kuto

(10) Patent No.: US 9,779,337 B2
(45) Date of Patent: Oct. 3, 2017

(54) SETTING STORAGE DEVICE, IMAGE FORMING APPARATUS, AND NON-TRANSITORY COMPUTER READABLE MEDIUM

(71) Applicant: FUJI XEROX CO., LTD., Tokyo (JP)

(72) Inventor: Nobuyuki Kuto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/260,837

(22) Filed: Apr. 24, 2014

(65) Prior Publication Data

US 2015/0098113 A1 Apr. 9, 2015

(30) Foreign Application Priority Data

Oct. 9, 2013 (JP) ................................ 2013-212263

(51) Int. Cl.
*G06K 15/00* (2006.01)
*G06K 15/02* (2006.01)
*G06F 3/12* (2006.01)

(52) U.S. Cl.
CPC ....... *G06K 15/1828* (2013.01); *G06F 3/1203* (2013.01); *G06F 3/1229* (2013.01); *G06F 3/1258* (2013.01); *G06F 3/1279* (2013.01)

(58) Field of Classification Search
None
See application file for complete search history.

(56) References Cited

U.S. PATENT DOCUMENTS

| | | | | |
|---|---|---|---|---|
| 2002/0196451 | A1* | 12/2002 | Schlonski | G06K 15/18 358/1.1 |
| 2008/0174061 | A1* | 7/2008 | Kurita | 270/45 |
| 2009/0121407 | A1* | 5/2009 | Kawamura | 270/32 |
| 2009/0284783 | A1* | 11/2009 | Kaneda | H04N 1/00347 358/1.15 |

(Continued)

FOREIGN PATENT DOCUMENTS

| | | |
|---|---|---|
| JP | 2005-190008 A | 7/2005 |
| JP | 2009-120271 A | 6/2009 |

(Continued)

OTHER PUBLICATIONS

Nov. 30, 2016 Office Action issued in Japanese Patent Application No. 2013-212263.

(Continued)

*Primary Examiner* — Miya J Williams
(74) *Attorney, Agent, or Firm* — Oliff PLC

(57) ABSTRACT

A setting storage device, includes: a storage unit that stores setting information and adjustment information to be associated with each other; and a control unit that in case that first setting information is introduced, compares contents in relation to predefined items of first adjustment information associated with the first setting information with corresponding contents of second adjustment information having been stored in the storage unit and, according to a comparison result, controls whether to store the first setting information to be associated with the second adjustment information stored in the storage unit or to store the first setting information and the first adjustment information associated with the first setting information.

7 Claims, 7 Drawing Sheets

(56) References Cited

U.S. PATENT DOCUMENTS

| | | | |
|---|---|---|---|
| 2009/0310171 A1* | 12/2009 | Onoda | G06F 3/1205 |
| | | | 358/1.15 |
| 2010/0167891 A1* | 7/2010 | Sakata | 493/25 |
| 2010/0265547 A1* | 10/2010 | Katou | G06F 3/1204 |
| | | | 358/1.16 |
| 2011/0134452 A1* | 6/2011 | Kim | G06F 3/1204 |
| | | | 358/1.13 |
| 2011/0219301 A1* | 9/2011 | Tomono | G06F 17/00 |
| | | | 715/274 |
| 2011/0228329 A1* | 9/2011 | Suzuki | 358/1.15 |
| 2012/0268791 A1* | 10/2012 | Shibata | G06K 15/1806 |
| | | | 358/1.16 |

FOREIGN PATENT DOCUMENTS

| | | |
|---|---|---|
| JP | A-2011-97460 | 5/2011 |
| JP | A-2011-116088 | 6/2011 |
| JP | 2012-083707 A | 4/2012 |

OTHER PUBLICATIONS

May 17, 2017 Office Action issued in Japanese Patent Application No. 2013-212263.

* cited by examiner

FIG. 3A  BEFORE INTRODUCTION
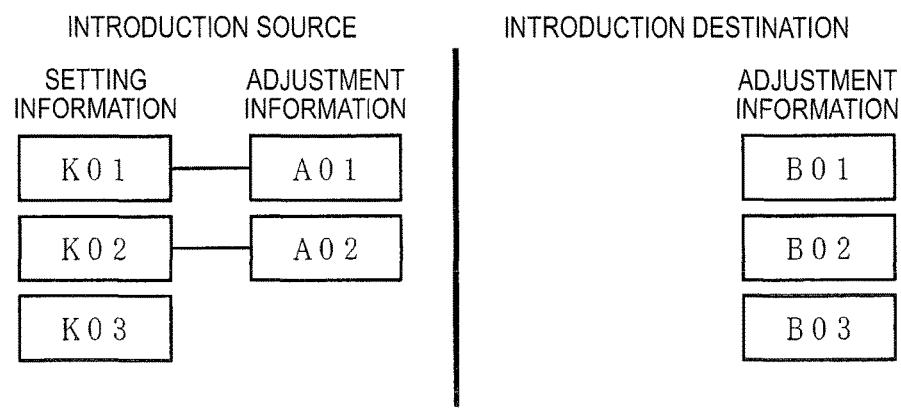
FIG. 3B  AFTER INTRODUCTION
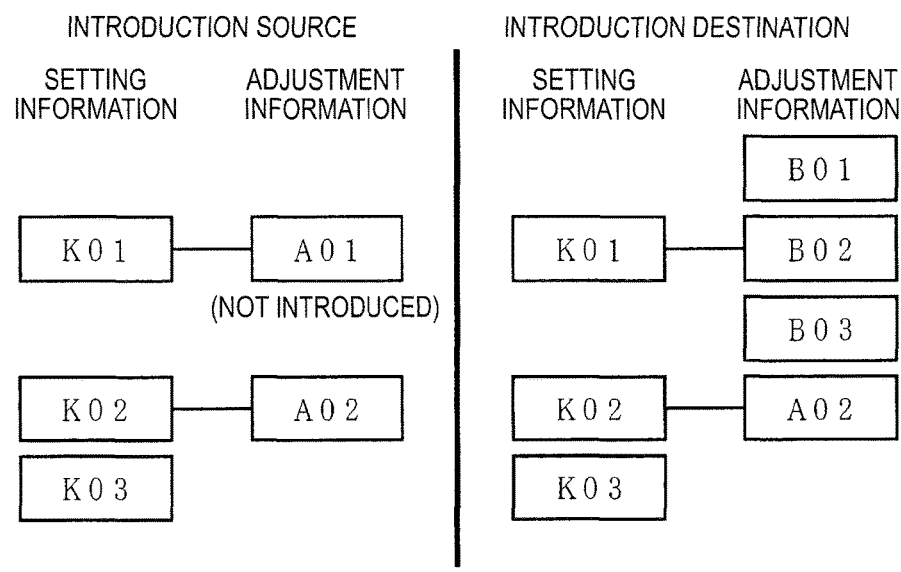

*FIG. 5A* SETTING INFORMATION

| NAME | SIZE | TYPE | COATING | NUMBER OF SHEETS IN ONE SET | PUNCH HOLES | POSITION ADJUSTMENT | FOLDING ADJUSTMENT |
|---|---|---|---|---|---|---|---|
| K01 | B5 | PLAIN PAPER | NO | NO DESIGNATION | NO | A01 | - |
| K02 | A4 | FILM | NO | NO DESIGNATION | - | - | A02 |
| K03 | POSTCARD | POSTCARD | COATING | NO DESIGNATION | - | - | - |
| ... | ... | ... | ... | ... | ... | ... | ... |

*FIG. 5B* POSITION ADJUSTMENT

| NAME | PAPER POSITION | | SQUARENESS | INCLINED DEGREE | MAGNIFICATION | PAPER COLOR | |
|---|---|---|---|---|---|---|---|
| | FRONT SURFACE | REAR SURFACE | | | | | |
| A01 | X1, Y1 | X2, Y2 | α1 | β1 | γ1 | BRIGHT YELLOW | ... |
| B01 | X3, Y3 | X4, Y4 | α2 | β2 | γ2 | BLUE | ... |
| B02 | X1, Y1 | X2, Y2 | α1 | β1 | γ1 | GRAY | ... |
| ... | ... | ... | ... | ... | ... | ... | ... |

*FIG. 5C* FOLDING ADJUSTMENT

| NAME | ADJUSTMENT AMOUNT | QUANTITY | PAPER COLOR | |
|---|---|---|---|---|
| A02 | T1 | G1 | TRANSPARENT | ... |
| B03 | T2 | G2 | PINK | ... |
| ... | ... | ... | ... | ... |

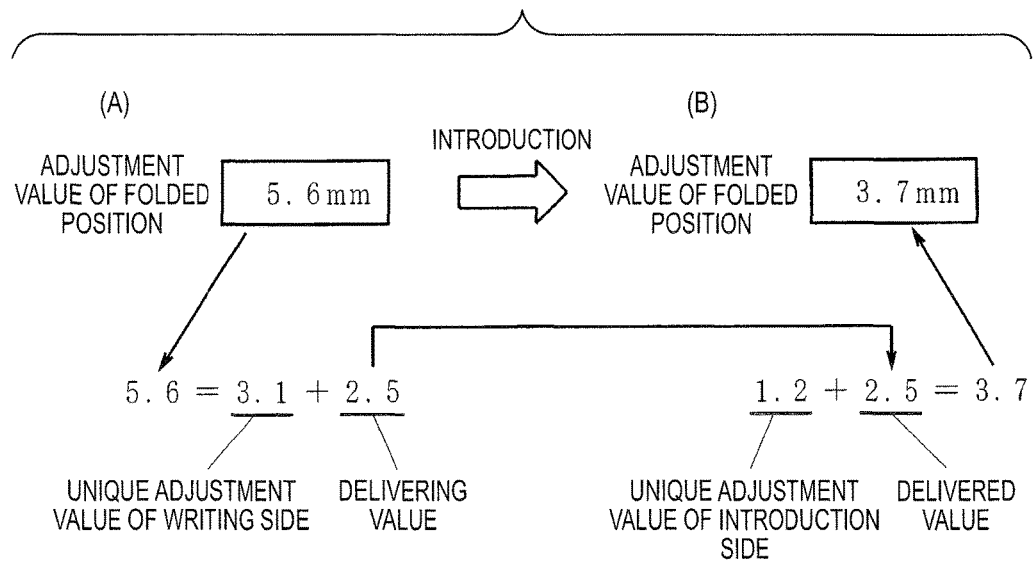

SETTING STORAGE DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2013-212263, filed on Oct. 9, 2013.

BACKGROUND

The present invention relates to a setting storage device, an image forming apparatus, and a non-transitory computer readable medium.

Various apparatuses are operated depending on previously introduced setting information and the setting information is typically set at each apparatus. There has been developed a method of transmitting the setting information to other apparatuses to use the setting information. And recently, there has been developed a method of generating the setting information at, for example, an external computer and introducing the setting information into each apparatus. For example, as an image forming apparatus having a function of forming an image on paper, there is an apparatus having a function of introducing setting information in which information on paper to be used is set in advance. In the technology, the setting of setting information is performed at, for example, one apparatus or computer and the setting information is introduced into a plurality of apparatuses, thereby preventing each apparatus from performing redundant settings.

The setting information may be associated with adjustment information of each apparatus.

And, for example, the setting information of the information on the paper in the image forming apparatus as described above may be associated with adjustment information such as alignment adjustment or folding adjustment. In case that the setting information is associated with the adjustment information as described above, the associated adjustment information may be also introduced when the setting information is introduced into a certain apparatus.

For example, at the time of introducing setting information, which is not present in a certain apparatus, into the apparatus, adjustment information having similar contents to adjustment information associated with the setting information may be present in the apparatus. Even though the adjustment information having the similar contents is present, the setting information is introduced together with the originally associated adjustment information. Therefore, a plurality of adjustment information pieces of which contents overlap may be present.

SUMMARY

According to an aspect of the present invention, a setting storage device, includes: a storage unit that stores setting information and adjustment information to be associated with each other; and a control unit that in case that first setting information is introduced, compares contents in relation to predefined items of first adjustment information associated with the first setting information with corresponding contents of second adjustment information having been stored in the storage unit and, according to a comparison result, controls whether to store the first setting information to be associated with the second adjustment information stored in the storage unit or to store the first setting information and the first adjustment information associated with the first setting information.

BRIEF DESCRIPTION OF THE DRAWINGS

Exemplary embodiment(s) of the present invention will be described in detail based on the following figures, wherein

FIGS. 3A and 3B are conceptual diagrams illustrating one detailed example of the introduction of setting information of the setting storage device according to the exemplary embodiment;

FIGS. 5A to 5C are explanatory diagrams of an example of setting information and adjustment information of the image forming apparatus according to the exemplary embodiment;

FIG. 6 is an explanatory diagram illustrating one detailed example of the modification of adjustment information of the setting storage device according to the exemplary embodiment.

DETAILED DESCRIPTION

Figure 1:
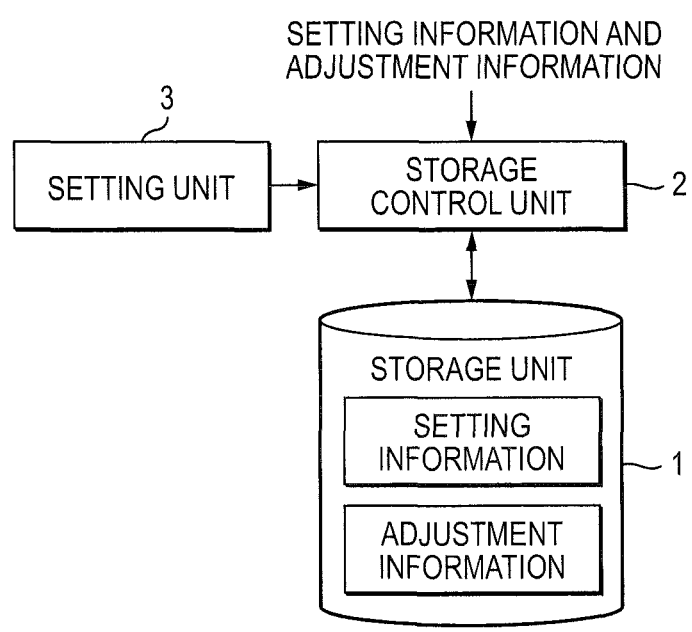
FIG. 1 is a configuration diagram illustrating a setting storage device according to an exemplary embodiment of the present invention.

FIG. 1 is a configuration diagram illustrating a setting storage device according to an exemplary embodiment of the present invention. In FIG. 1, reference numeral 1 is a storage unit, reference numeral 2 is a storage control unit, and reference numeral 3 is a setting unit. The storage unit 1 stores, for example, setting information and adjustment information. The setting information may be associated with at least one adjustment information piece.

The storage control unit 2 controls recording and reading out of information in and from the storage unit 1. When the setting information written by, for example, another apparatus or an external computer is introduced, the adjustment information associated with the setting information is also introduced. In this case, contents in relation to predefined items in the adjustment information associated with the setting information to be introduced are compared with contents of the adjustment information stored in the storage unit 1. According to the comparison result, the storage control unit 2 controls whether to store the setting information to be associated with the adjustment information stored in the storage unit 1 or to store the setting information and the adjustment information associated with the setting information.

In more detail, when there is adjustment information stored in the storage unit 1 which has the same contents in relation to the predefined items as the contents of the predefined items in the adjustment information to be introduced, the setting information is stored in the storage unit 1 to be associated with the existing adjustment information. In this case, the adjustment information which has been intended to be introduced is not stored in the storage unit 1 and thus the increase in the adjustment information is suppressed. When there is no adjustment information which has the same contents in relation to the predefined items as the contents of the predefined items in the adjustment information to be introduced, the setting information and the adjustment information associated with the setting information are stored in the storage unit 1.

At the time of comparing the contents of the adjustment information, whether to limit comparing items to some items or set the overall items as the comparing items may be switched depending on settings, or the items to be compared may be set by a setting unit 3 to be described below. Further, the comparison of the contents may be performed depending on whether both the contents to be compared fall within the predefined range of each item.

When the adjustment information to be introduced is stored in the storage unit 1, the contents of the adjustment information may be modified depending on a previously acquired adjustment value unique to the apparatus. Further, the storage control unit 2 may have a function of collectively introducing a plurality of setting information pieces. Further, the storage control unit 2 may have a function of reading out the setting information and the adjustment information, which are stored in the storage unit 1, and transmitting the read setting information and adjustment information to external or other apparatuses.

The setting unit 3 allows a user to set items on which the contents of the adjustment information are compared by the storage control unit 2. In the storage control unit 2, even though contents in relation to items other than the items to be compared are different from those of adjustment information to be introduced, the adjustment information stored in the storage unit 1 may be used. Thus, some items which may cause a problem when their contents are different from those of the adjustment information to be introduced are set as at least targets to be compared. In connection with the other items, when the items to be compared are increased, the case in which the adjustment information stored in the storage unit 1 is used is reduced, and thus a total amount of adjustment information pieces is increased, and when the items to be compared is reduced, the use of the adjustment information stored in the storage unit 1 is increased to suppress an increase in the total amount of adjustment information pieces. The items to be compared may be set in consideration of the importance of comparison of the increased degree of adjustment information with each item.

The setting unit 3 may be configured to set whether the overall items are used as the comparison targets or the predefined items are used as the comparison targets. Further, when the items to be compared are fixed, the setting unit 3 may be omitted.

Figure 2:
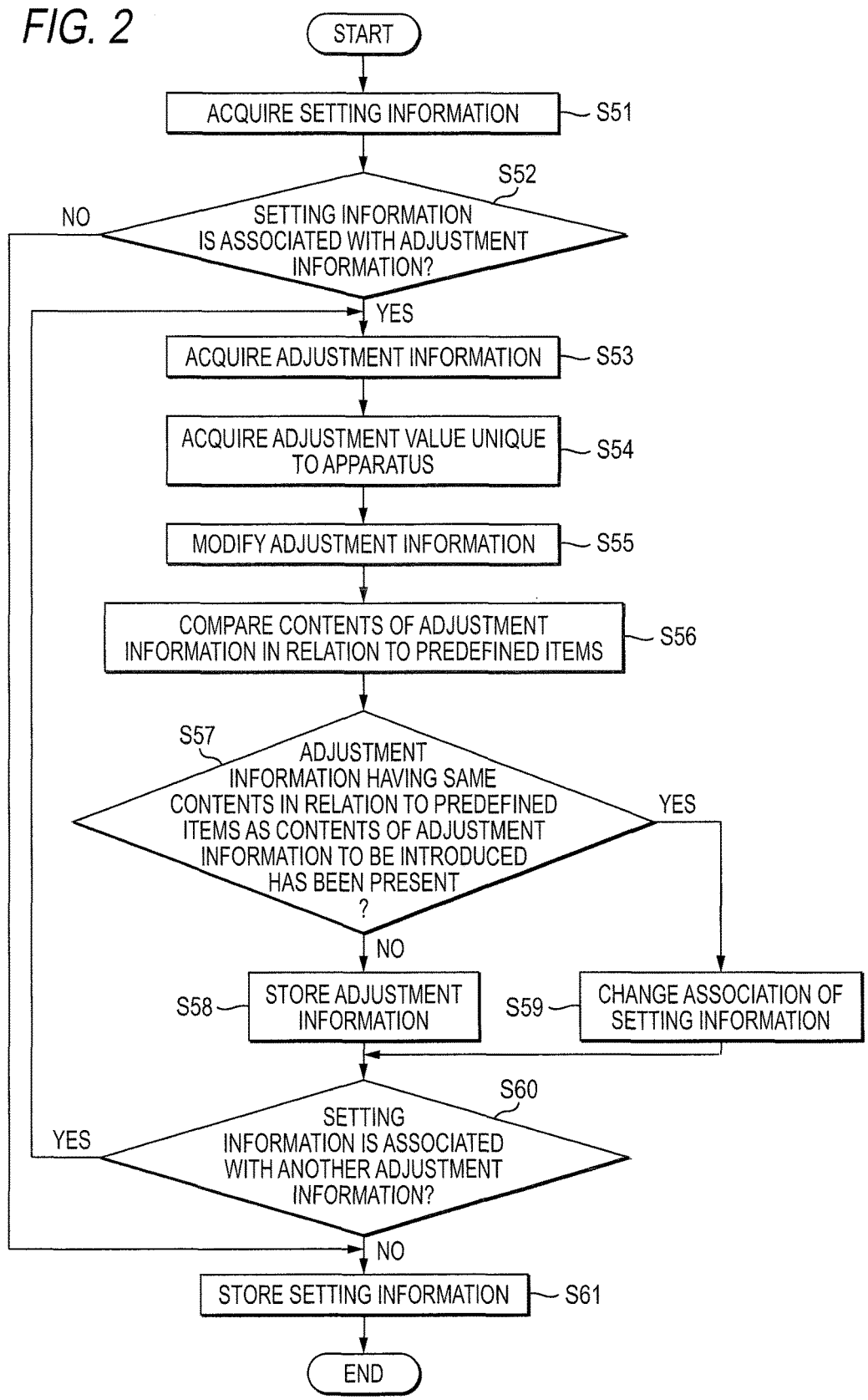
FIG. 2 is a flow chart illustrating an example of an operation of the setting storage device according to the exemplary embodiment.

The storage unit 1, the storage control unit 2, and the setting unit 3 may coexist in a certain apparatus and any one or each of the storage unit 1, the storage control unit 2, and the setting unit 3 may be disposed in a separate apparatus to be connected via, for example, a communication channel FIG. 2 is a flow chart illustrating an example of an operation of the setting storage device according to the exemplary embodiment of the present invention. An example of an operation of the case in which one setting information piece is introduced will be described herein.

In step S51, setting information to be introduced is acquired. In step S52, it is determined whether the acquired setting information is associated with adjustment information. When the associated adjustment information is not present, in step S61, the setting information is stored in the storage unit 1 and introduction processing of the setting information ends.

In step S52, if it is determined that the acquired setting information is associated with the adjustment information, in step S53, the associated adjustment information is specified and acquired. In the operation example, the acquired adjustment information is modified depending on the introduction side apparatus. In step S54, a unique adjustment value which has been previously acquired for the apparatus into which the adjustment information is introduced is acquired and in step S55, contents of the adjustment information are recalculated and modified depending on the adjustment value. Due to the modification, there is no need to perform the adjustment according to the apparatus again. Further, at the time of comparing the contents as described below, a comparison of the adjustment information set according to the apparatus is performed. Further, when the information relying on the apparatus is not present in the adjustment information, the processing of S54 and S55 are not required.

In step S56, contents in relation to predefined items in the adjustment information to be introduced are compared with the contents of the adjustment information stored in the storage unit 1. The items to be compared may be fixed items and may be items set by the setting unit 3. The comparison of overall items may be designated. When the plurality of adjustment information pieces is stored in the storage unit 1, each adjustment information piece is compared with respect to the predefined items.

In step S57, it is determined whether there is adjustment information stored in the storage unit 1 which has the same contents of the predefined items as the contents of the adjustment information to be introduced. If not present, in step S58, the adjustment information to be introduced is stored in the storage unit 1.

In step S57, if it is determined that there is the adjustment information which has the same contents of the predefined items as the contents of the adjustment information to be introduced, in step S59, the existing adjustment information is associated with the setting information to be introduced. Further, when there is a plurality of adjustment information pieces which has the same contents of the predefined items as the contents of the adjustment information to be introduced, any one of the adjustment information pieces may be associated with the setting information. For example, the adjustment information may be selected by several methods such as a method of selecting the adjustment information having the most similar contents by comparing contents of items other than the predefined items and a method of ordering items other than the predefined items and selecting the adjustment information having the same contents as the contents of the adjustment information to be introduced in relation to the items having a higher priority. In step S59, the adjustment information to be introduced is not stored in the storage unit 1.

After the processing of steps S58 and S59, in step S60, it is determined whether other adjustment information pieces are associated with the setting information. In addition to this, when the setting information is associated with non-processed adjustment information, the process returns to step S53 to acquire the non-processed adjustment information and perform a processing on the adjustment information. If it is determined that the setting information is not associated with the non-processed adjustment information, in step S61, the setting information is stored in the storage unit 1 and the introduction processing for the setting information ends.

When the setting information is stored in step S61, association with the adjustment information may be rewritten in step S59. That is, in the introduction of the setting information, when the setting information is associated with adjustment information and there exists adjustment information having the same contents of the predefined items as the adjustment information to be introduced, the adjustment information to be introduced is not stored in the storage unit 1 and the adjustment information stored in the storage unit 1 is used. Therefore, in this case, the adjustment information stored in the storage unit 1 is not increased.

When a plurality of setting information pieces is introduced, the above-mentioned processing may be performed on each setting information piece.

FIGS. 3A and 3B are conceptual diagrams illustrating one detailed example of the introduction of setting information of the setting storage device according to the exemplary embodiment of the present invention. FIG. 3A illustrates each information piece before being introduced. In the detailed example, as the setting information, three setting information pieces of 'K01', 'K02', and 'K03' are illustrated, in which the 'K01' is associated with adjustment information having a name of 'A01', and the 'K02' is associated with adjustment information having a name of 'A02'. Meanwhile, the adjustment information pieces having the names of 'B01', 'B02', and 'B03' are stored as adjustment information in the storage unit 1. In this state, the setting information is introduced.

The state after the setting information is introduced is illustrated in FIG. 3B. First, the case in which the setting information 'K01' is introduced will be described. The setting information 'K01' is associated with the adjustment information 'A01'. It is determined whether the adjustment information 'B01', 'B02', or 'B03' stored in the storage unit 1 has the same contents of the predefined items as the contents of the adjustment information 'A01' to be introduced. Herein, it is assumed that the contents of the predefined items of the adjustment information 'B02' are the same as the contents of the adjustment information 'A01' to be introduced. In this case, the setting information 'K01' is stored in the storage unit 1 to be associated with the adjustment information 'B02' stored in the storage unit 1 instead of the adjustment information 'A01'. Since the adjustment information 'B02' already stored in the storage unit 1 is used, the adjustment information 'A01' is not stored in the storage unit 1. Therefore, in this case, the adjustment information stored in the storage unit 1 is not increased.

Next, the case in which the setting information 'K02' is introduced will be described. The setting information 'K02' is associated with the adjustment information 'A02'. It is determined whether the adjustment information 'B01', 'B02', or 'B03' stored in the storage unit 1 has the same contents of the predefined items as the contents of the adjustment information 'A02' to be introduced. Herein, it is assumed that the adjustment information having the same contents is not stored in the storage unit 1. In this case, since the adjustment information which may replace the adjustment information 'A02' is not present in the storage unit 1, the setting information 'K02' and the adjustment information 'A02', which are to be introduced, are stored in the storage unit 1.

The setting information 'K03' is not associated with adjustment information and thus may be stored in the storage unit 1 as it is.

In this way, when the setting information is introduced, the associated adjustment information is also introduced. Therefore, there is no need to write the setting information or the adjustment information again. When the adjustment information is introduced, if there is adjustment information stored in the storage unit 1 which has the same contents of the predefined items as the contents of the adjustment information to be introduced, the adjustment information present in the storage unit 1 is used. Thus, the increase in the adjustment information is suppressed, as compared with the case in which the adjustment information is introduced as it is.

Even though the modification of the adjustment information relying on the apparatus is not described herein, the adjustment information may be modified before being stored in the storage unit 1.

Figure 4:
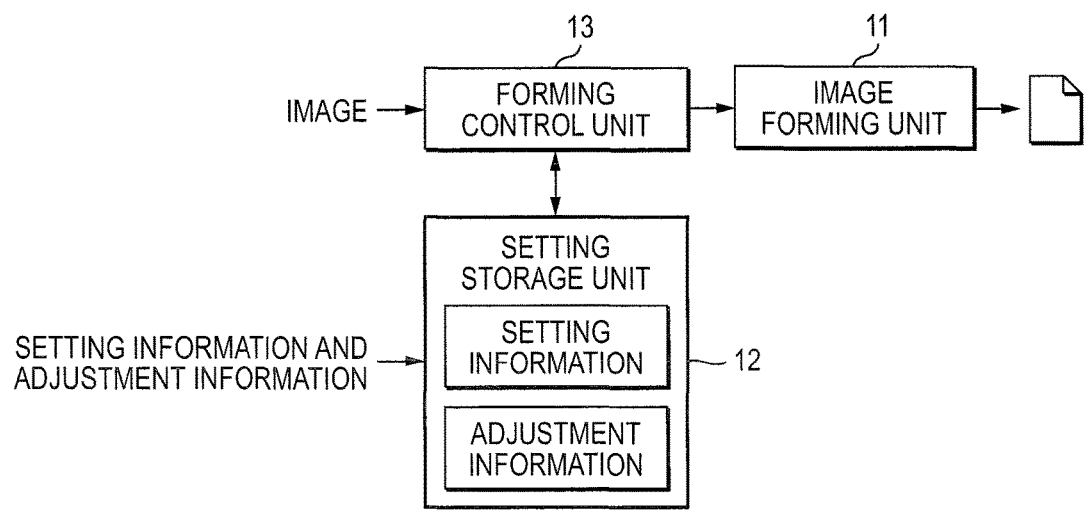
FIG. 4 is a configuration diagram illustrating an image forming apparatus according to an exemplary embodiment.

FIG. 4 is a configuration diagram illustrating an image forming apparatus according to an exemplary embodiment of the present invention. In FIG. 4, reference numeral 11 is an image forming unit, reference numeral 12 is a setting storage unit, and reference numeral 13 is a forming control unit. The image forming unit 11 forms a given image on a medium such as paper according to the control by the forming control unit 13.

A setting storage unit 12 includes the above described configuration of the setting storage device according to the exemplary embodiment, for example, at least the storage unit 1, and stores, for example, the setting information, and the adjustment information. As described above, there is a case in which the setting information is associated with at least one adjustment information piece.

The forming control unit 13 operates the image forming unit 11 according to the setting information and the adjustment information which are stored in the setting storage unit 12. Further, the forming control unit 13 may be configured to include the above described function of the storage control unit 2 of the setting storage device according to the exemplary embodiment of the present invention.

FIGS. 5A to 5C are explanatory diagrams of an example of setting information and adjustment information of the image forming apparatus according to the exemplary embodiment of the present invention. FIG. 5A illustrates an example of the setting information. The setting information is information on the paper to be used, and in this example, indicates each setting item such as a size, a paper type, presence or absence of coating, the number of sheets in one set, presence and absence of punch holes, position adjustment, and folding adjustment. Further, various setting items may be present in addition to the above setting items, and some of the setting items may not be used as the setting items.

Among these setting items, in this example, there is a case in which the position adjustment and the folding adjustment refer to the adjustment information. For example, the setting information having the name of 'K01' indicates that the setting item of the position adjustment refers to the adjustment information 'A01'. Further, the setting information having the name of 'K02' indicates that the setting item of the folding adjustment refers to the adjustment information 'A02'.

FIG. 5B schematically illustrates an example of the information included in the adjustment information when the adjustment information includes, for example, information for adjusting an image forming position. In this example, it is assumed that each item of a paper position, squareness, inclined degree, magnification, and a paper color is set. An example of the adjustment information 'A01' associated with the setting information 'K01' and the adjustment information 'B01' and 'B02' stored in the storage unit 1 is illustrated herein.

FIG. 5C schematically illustrates an example of the information included in the adjustment information when the adjustment information includes, for example, information on folding adjustment. The adjustment amount of the folding adjustment indicates a deviation amount of the edge when paper is folded. In addition, it is assumed that items such as a mass of paper and a paper color are set. An example of the adjustment information 'A02' associated with the setting information 'K02' and the adjustment information 'B03' stored in the storage unit 1 is illustrated herein.

The setting information and the adjustment information are written by a certain image forming apparatus and introduced into a separate image forming apparatus or are written by the separate image forming apparatus and introduced into each image forming apparatus. In this case, the setting storage unit 12 is operated by the above described operation of the setting storage device according to the exemplary embodiment of the present invention, for example, depending on the example of the operation illustrated in FIG. 2 so that the setting information and the adjustment information may be introduced and stored in the setting storage unit 12.

As the detailed example when the setting information and the adjustment information are introduced, a detailed example illustrated in FIGS. 5A to 5C will be described with reference to FIGS. 3A and 3B. When the setting information 'B01' is introduced, the adjustment information 'A01' is associated with the setting information 'B01'. It is determined whether the adjustment information 'B01', 'B02', or 'B03' stored in the storage unit 1 has the same contents of the predefined items as the contents of the adjustment information 'A01' to be introduced.

For example, in the adjustment information adjusting the image forming position illustrated in FIG. 5B, each item of, for example, a paper position, squareness, inclined degree, or magnification has a connection with the image forming position. Therefore, as the predefined items, the items of, for example, the paper position, the squareness, the inclined degree, and the magnification may be set. The item of the paper color does not have a direct connection with the image forming position. Therefore, even though the paper color is excluded from the items to be compared, no problem occurs when the adjustment information to be introduced is associated with the adjustment information of other contents.

The contents of the predefined items of the adjustment information 'A01' to be introduced and the adjustment information 'B01' and 'B02' which are stored in the storage unit 1 are compared with each other based on the predefined items such as the paper position, the squareness, the inclined degree, and the magnification. Then, as the adjustment information having the same contents of the predefined items as the contents of the adjustment information 'A01' to be introduced, there exists the adjustment information 'B02'. In this case, even though the paper colors are different from each other, the adjustment information 'B02' is set to be used. The setting information 'K01' is stored in the storage unit 1 to be associated with the adjustment information 'B02'. Since the adjustment information 'B02' already stored in the storage unit 1 is used, the adjustment information 'A01' is not stored in the storage unit 1. Therefore, in this case, the adjustment information stored in the storage unit 1 is not increased.

For example, when the setting information 'K02' is introduced, since the adjustment information 'A02' is associated with the setting information 'K02', it is determined whether the adjustment information 'B01', 'B02', or 'B03' stored in the storage unit 1 has the same contents of the predefined items as the contents of the adjustment information 'A02' to be introduced.

For example, in the adjustment information for adjusting the image forming position illustrated in FIG. 5C, each item such as the adjustment amount and the mass of the folding adjustment is associated when the paper is folded. Therefore, as the predefined items, the items such as the adjustment amount and the mass may be set. The item of the paper color is not directly associated when the paper is folded. Therefore, even though the paper color is excluded from the items to be compared, no problem occurs when the adjustment information to be introduced is associated with the adjustment information of other contents.

The contents of the predefined items of the adjustment information 'A02' to be introduced and the adjustment information 'B03' which is stored in the storage unit 1 are compared with each other based on the predefined items such as the adjustment amount and the mass. Then, in connection with the contents of the predefined items, the contents of the adjustment information 'A02' and the adjustment information 'B03' are different from each other. Further, the adjustment information pieces 'B01' and 'B02' are adjustment information pieces for adjusting the image forming position, and are different from the adjustment information of the folding adjustment. Therefore, the adjustment information 'A02' is stored in the storage unit 1, along with the setting information 'K02'. In this case, the association of the setting information 'K02' with the adjustment information 'A02' is continued as it is.

In this way, when the setting information is introduced, if the adjustment information which substitutes for the associated adjustment information is stored in the storage unit 1, the existing adjustment information is used to be associated with the setting information, and thus the increase in the adjustment information is suppressed. Further, when the adjustment information for substitution is not stored in the storage unit 1, the adjustment information is also stored in the storage unit 1 along with the setting information, and as a result, the association is not lost.

FIG. 6 is an explanatory diagram illustrating one detailed example of the modification of adjustment information of the setting storage device according to the exemplary embodiment of the present invention. The modification processing performed on the adjustment information at the time of introduction will be described with reference to the detailed example. For example, it is assumed that the adjustment information written by a certain image forming apparatus is introduced into a separate image forming apparatus.

In part (a) of FIG. 6, the detailed example of the written adjustment information of the folded position is illustrated. In this example, it is assumed that as one adjustment information piece, shifting of the folded position of two sheets of paper by, an adjustment value, 5.6 mm is set. In the image forming apparatus in which the adjustment information is written, a unique adjustment value of the folded position is present in the image forming apparatus. The adjustment information of the folded position may include the unique adjustment value. When the unique adjustment value is set to be 3.1 mm, 2.5 mm obtained by removing the unique adjustment value may be delivered to another image forming apparatus as the adjustment value of the folded position based on equation 3.1+2.5=5.6 when the adjustment information of the folded position is introduced into another image forming apparatus.

In part (b) of FIG. 6, the modification processing when the adjustment information including the adjustment value of the folded position is introduced is illustrated. As described above, a modified adjustment value of the folded position in the introduction side image forming apparatus is obtained from the delivered adjustment value of the folded position and the unique adjustment value of the introduction side image forming apparatus. For example, when the unique adjustment value of the introduction side image forming apparatus is 1.2 mm, the adjustment value of the folded position in the delivered adjustment information, 2.5 mm, is added thereto. Based on equation 1.2+2.5=3.7, the adjustment value of the folded position after modification is set as 3.7 mm and is stored in the setting storage unit 12 as the adjustment information.

The adjustment information is modified by the unique adjustment value of the apparatus as described above, and thus even though the adjustment information is introduced into any of the image forming apparatuses, the occurrence of a mismatch is prevented. The adjustment value of the folded position is illustrated herein, but for example, at the time of introduction, the adjustment value of the image forming position illustrated in FIG. 5B may also be modified depending on the unique adjustment value of the apparatus. Further, when unique adjustment values of the apparatus are present in relation to other adjustment information pieces, the adjustment information may also be modified depending on the unique adjustment values of the apparatus.

As described above, the adjustment information is modified depending on the introduction side apparatus, and therefore no change occurs in each apparatus. Further, there is no need to write different adjustment information pieces in each apparatus.

In the above-mentioned detailed example, the case in which the information on the paper to be used is introduced as the setting information is described by way of example. However, the present invention is not limited thereto, and variously set information may be used as the setting information and any associated information may be associated as the adjustment information.

The example in which the setting storage device according to the exemplary embodiment of the present invention is applied to the image forming apparatus is illustrated herein, but the setting storage device may be applied to various apparatuses of which settings may be performed even in other apparatuses. For example, in the case of an image reading apparatus, various reading conditions are used as the setting information and the associated information is associated as the adjustment information, and the setting storage device according to the exemplary embodiment of the present invention may be applied to the case in which the setting information written by another apparatus is introduced.

Figure 7:
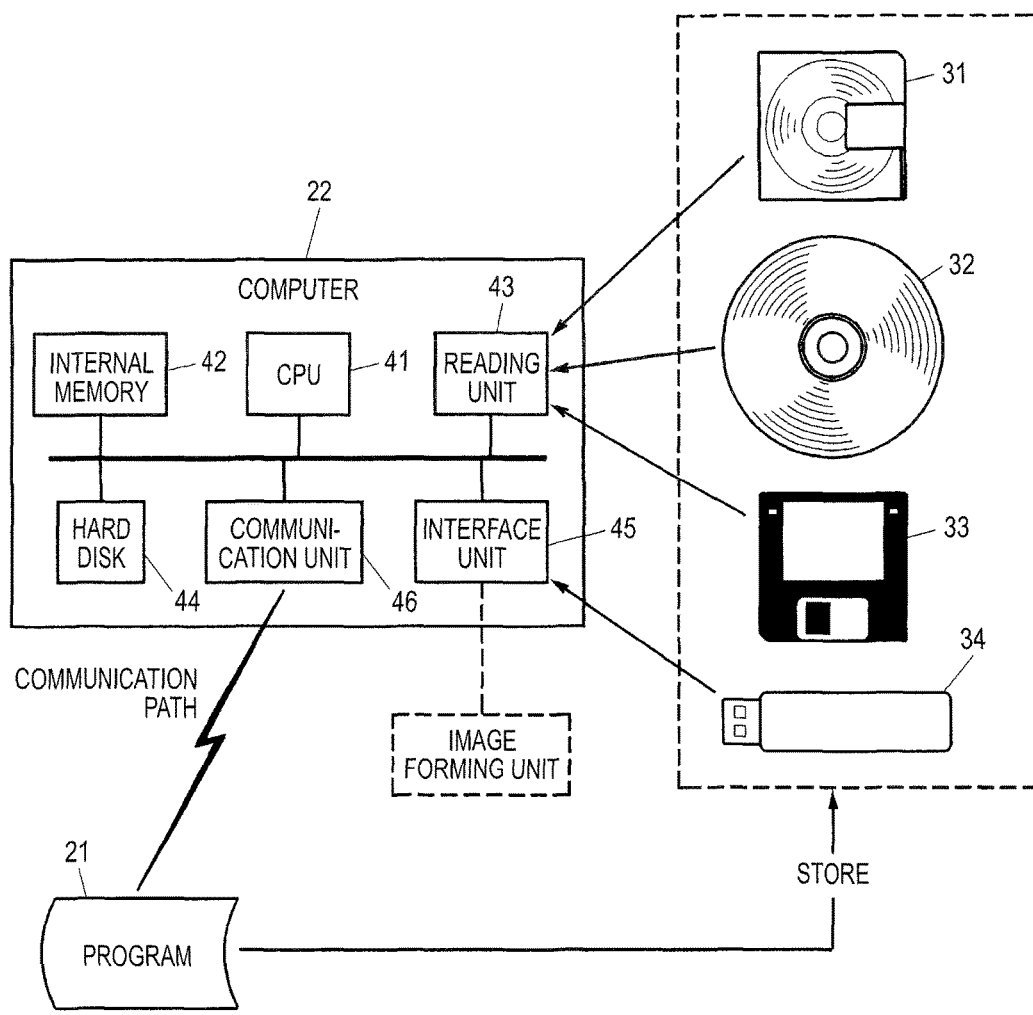
FIG. 7 is an explanatory diagram of one example of a computer program, a storage medium in which the computer program is stored, and a computer, in the case in which a function of a storage control unit described in the setting storage device according to the exemplary embodiment of the present invention is realized by the computer program.

FIG. 7 is an explanatory diagram of one example of a computer program, a storage medium in which the computer program is stored, and a computer, in case that a function of the storage control unit described in the setting storage device according to the exemplary embodiment of the present invention is realized by the computer program. In FIG. 7, reference numeral 21 is a program, reference numeral 22 is a computer, reference numeral 31 is a magneto-optical disk, reference numeral 32 is an optical disc, reference numeral 33 is a magnetic disc, reference numeral 34 is a memory, reference numeral 41 is a CPU, reference numeral 42 is an internal memory, reference numeral 43 is a reading unit, reference numeral 44 is a hard disc, reference numeral 45 is an interface unit, and reference numeral 46 is a communication unit.

All or a part of the above described functions of the storage control unit 2 in the setting storage device according to the exemplary embodiment of the present invention may be realized by the program 21 which is executed by the computer. In this case, for example, the program 21 and data used by the program may be stored in a computer-readable storage medium. The storage medium causes a change of an energy state, such as magnetism, light, and electricity, with respect to the reading unit 43 provided in a hardware resource of the computer, depending on a description content of the program, and transfers the description content of the program to the reading unit 43 in a signal type corresponding thereto. For example, as the storage medium, there are the magneto-optical disc 31, the optical disc 32 (including, for example, a CD or a DVD), the magnetic disc 33, and the memory 34 (including, for example, an IC card, a memory card, or a flash memory). Further, these storage media are not limited to a portable type.

The program 21 is stored in these storage media and these storage media are mounted in, for example, the reading unit 43 or the interface unit 45 of the computer 22 so as to read out the program 21 from the computer. Then, the program 21 is stored in the internal memory 42 or the hard disk 44 (including, for example, a magnetic disc, or a silicon disc) to be executed by the CPU 41, and all or a part of the above described functions of the storage control unit 2 in the setting storage device according to the exemplary embodiment of the present invention is realized. Alternatively, the program 21 may be transmitted to the computer 22 through a communication channel, and in the computer 22, the program 21 may be received by the communication unit 46 and thus may be stored in the internal memory 42 or the hard disk 44 so that the program 21 may be executed and realized by the CPU 41.

The above described storage unit 1 in the setting storage device according to the exemplary embodiment of the present invention may be constituted by, for example, the hard disc 44 or the internal memory 42.

In addition to these, the computer 22 may be connected to various apparatuses through the interface unit 45. For example, the computer 22 is connected to the image forming unit 11 which forms an image on paper, and the function of the image forming apparatus according to the exemplary embodiment of the present invention may be realized by the computer 22, being integrated with the program realizing the function of the forming control unit 13. Further, other apparatuses may be connected to the interface unit 45. Further, each processing needs not be operated in one computer and the processing may be executed by a separate computer depending on the processing step.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A setting storage device, comprising:
a storage unit that stores setting information, each setting information including a plurality of pieces of information on paper on which an image is formed, and adjustment information, each adjustment information including a plurality of pieces of information for adjusting an image forming position of the image, to be associated with each other, wherein at least some of the setting information relates to the adjustment information, and the adjustment information includes details of a type of adjustment relating to the at least some of the setting information; and
a control unit that in case that first setting information is introduced, compares contents in relation to predefined items of first adjustment information associated with the first setting information with corresponding contents of second adjustment information having been stored in the storage unit by a time the first setting information is introduced and, according to a comparison result, controls whether to store the first setting information to be associated with the second adjustment information stored in the storage unit or to store the first setting information and the first adjustment information associated with the first setting information.

2. The setting storage device of claim 1, wherein the control unit switches whether to compare the contents of the adjustment information in relation to limited items or to compare the contents of the adjustment information in relation to overall items, depending on settings, at the time of the comparison.

3. The setting storage device of claim 1, further comprising:
a setting unit configured to set the items.

4. An image forming apparatus, comprising:
an image forming unit;
the setting storage device of claim 1; and
a forming control unit that operates the image forming unit depending on the setting information and the adjustment information stored in the setting storage device.

5. The setting storage device of claim 4, wherein the comparison is performed when the first setting information associated with the first adjustment information is introduced from another image forming apparatus.

6. The setting storage device of claim 1, wherein the predefined items indicate at least one of paper position, squareness, inclined degree and magnification.

7. A non-transitory computer readable medium storing a program causing a computer to execute a process for controlling a setting storage device comprising a storage unit which stores setting information, each setting information including a plurality of pieces of information on paper on which an image is formed, and adjustment information, each adjustment information including a plurality of pieces of information for adjusting an image forming position of the image, to be associated with each other, wherein at least some of the setting information relates to the adjustment information, and the adjustment information includes details of a type of adjustment relating to the at least some of the setting information the process comprising:
in case that first setting information is introduced, comparing contents in relation to predefined items of first adjustment information associated with the first setting information with corresponding contents of second adjustment information having been stored in the storage unit by a time the first setting information is introduced; and
according to a comparison result, controlling whether to store the first setting information to be associated with the second adjustment information stored in the storage unit or to store the first setting information and the first adjustment information associated with the first setting information.

* * * * *